Sept. 13, 1932.  A. B. SEPPMANN  1,877,366
BRAKE TESTER
Filed April 4, 1927
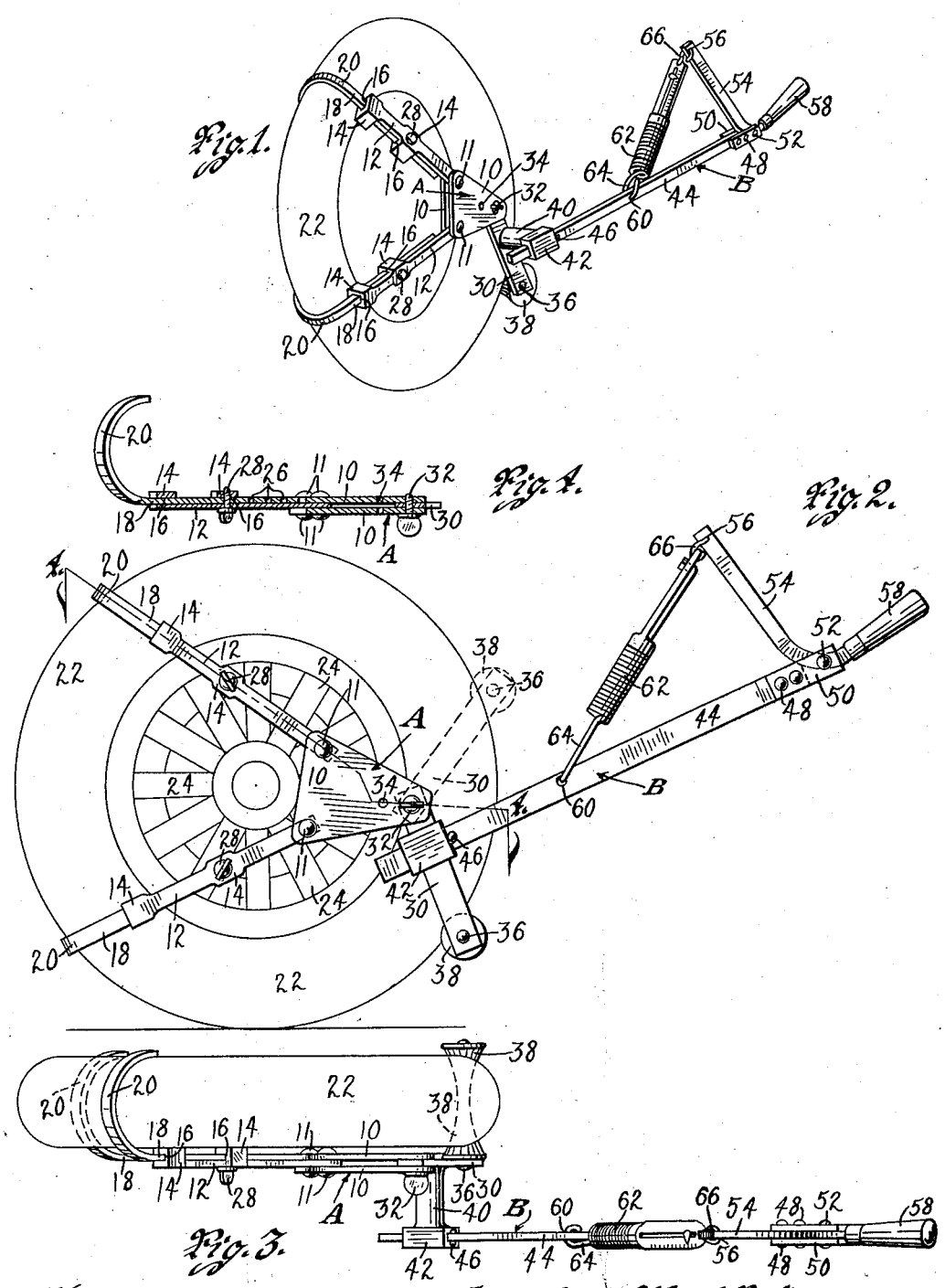
Witness
L. F. Sandberg
Inventor— Alfred B. Seppmann
by Bair & Freeman Attorneys Patented Sept. 13, 1932

1,877,366

UNITED STATES PATENT OFFICE

ALFRED B. SEPPMANN, OF LAKE CRYSTAL, MINNESOTA

BRAKE TESTER

Application filed April 4, 1927. Serial No. 180,821.

The object of my invention is to provide a brake tester especially adapted for testing the brakes of automobiles and trucks which is of simple, durable and comparatively inexpensive construction.

Still a further object is to provide a wheel engaging device which is readily and quickly operable for engaging any wheel of the automobile or truck whereby the wheel may be rotated for the purpose of testing the brake thereon.

More particularly it is my object to provide means on the wheel engaging device for measuring the force required to rotate the wheel to which the device is applied.

Still a further object of my device is to provide for adjustment of the parts of the wheel engaging device so that it may be adapted to wheels having tires of various diameters and also tires of various types such as solid tires, pneumatic tires or balloon tires.

Still a further object is to provide a lever operatively connected to the wheel engaging device for causing the device to firmly grip the tire which thereafter serves as a lever for operating the wheel engaging device and causing rotation of the wheel itself.

Still a further object of my invention is to provide a handle on the lever for convenience in rotating the automobile wheel and to provide a measuring means such as a spring scale to be connected between the lever itself and the handle whereby the force exerted on the handle may be accurately measured.

With these and other objects in view my invention consists in the construction, arrangement and combination of the various parts of my device, whereby the objects contemplated are attained, as hereinafter more fully set forth, pointed out in my claims, and illustrated in the accompanying drawing, in which:

Figure 1 is a perspective view of a device embodying my invention and showing it in connection with an automobile tire to illustrate its engagement therewith.

Figure 2 is a side elevation of the same showing the device in operation.

Figure 3 is a plan view of my brake tester as applied to a tire and

Figure 4 is a detail sectional view taken on the line 4—4 of Figure 2.

My device is designed primarily for the testing of brakes on four wheel automobiles. It is well known that the desirable adjustment of these brakes is very particular. The brake of each rear wheel must have the same braking effect on the wheel and the brake on each front wheel must have the same braking effect on each of them. It is also desirable that the braking effect of the rear wheels be different from the front wheels in order that the brakes may be most effective in stopping the car.

Proper adjustment of the brakes is further necessary to prevent any skidding of the car which is more particular in automobiles provided with four brake wheels than in automobiles having brakes on only the rear wheels.

On the accompanying drawing I have used the reference letter A to indicate generally a wheel engaging device. The reference letter B indicates an operating lever for actuating the wheel engaging device A and thereby causing rotation of the wheel to which the brake tester is applied.

The wheel engaging device A comprises a pair of plates 10 substantially triangular in shape. Pivoted between the plates 10 by means of rivets or the like 11 are a pair of links 12. The links 12 are each provided with a pair of loop-like portions 14 for forming openings 16. Slidably mounted through the openings 16 in each link 12 is a bar 18 having a hooked portion 20 adapted to partially encircle the tire 22 of the wheel 24 of the automobile.

Each bar 18 is provided with a series of openings 26. The inner loop 14 of the link 12 is provided with openings, the one adjacent the wheel 24 being threaded to receive the threaded portion of a locking pin 28. The pin 28 is adapted to extend through any one of the openings 26 of the bar 18 whereby the hook portions 20 may be spaced different distances from the plates 10 of the wheel engaging device for accommodating tires of various sizes.

At the corner of the triangular plates 10 opposite the rivets 11 is pivoted a wheel engaging lever 30. The wheel engaging lever 30 is mounted for pivotal movement on a pin 32 extending through the plates 10 and having a screw threaded engagement with the plate nearest the wheel 24. For obtaining a different adjustment of the lever 30 relative to the plates 10, a pair of openings 34 are provided for receiving the pin 32.

Secured to the wheel engaging lever 30 is a shaft 36 extending at right angles therefrom. Pivotally mounted on the shaft 36 is a wheel engaging roller 38.

Secured to the wheel engaging lever 30 is a post 40 having mounted on its outer end a substantially rectangular sleeve member 42. The sleeve member 42 is adapted to have received therein an operating lever 44. The operating lever 44 has a pin 46 extending therethrough for engaging one end of the sleeve member 42 to act as a stop.

The wheel engaging lever 30 with roller 38, the post 40 and the operating lever 44 together constitute a medially laterally offset lever having an L-shaped portion or member; and the plates 10, rivets 11 and pin 32 constitute means for pivotally connecting the tire engaging hooks 20 to the L-shaped or offset lever.

Secured to the outer end of the lever 44 as by rivets 48 is a pair of plates 50. Pivoted between the plates 50 on a bolt or the like 52 is a hand lever 54 of bell crank shape. The hand lever 54 is provided at one end with an opening 56 and has secured to the other end thereof a handle 58.

An opening 60 is provided in the operating lever 44 and a spring scale device 62 has the hook end 64 thereof engaged in the opening 60. The other end of the spring scale device 62 is provided with a hook 66 to engage in the opening 56 of the hand lever 54.

From the foregoing it will be seen that any movement of the handle 58 and consequently the hand lever 54 relative to the operating lever 44 can be accurately measured by taking readings on the spring scale device 62.

*Practical operation*

In the operation of my device for the testing of brakes as for instance on an automobile, the automobile is jacked up so that the testing may be done; a suitable means may be provided for depressing the brake pedal to any ordinary braking position.

The hooks 20 of the testing device are then adjusted approximately to the tire of the automobile and if necessary the lever 30 is adjusted. The hooks 20 are then positioned in spaced relation as illustrated and engage the tire 22 of the wheel. The lever 30 is swung downwardly until the roller 38 engages the tire, the lever 44 having previously been inserted in the sleeve 42. A further downward movement of the lever 44 causes pivotal movement of the lever 30 and thereby the roller 38 firmly engages the tire of the automobile and draws the hooks 20 tighter to assist in holding the wheel engaging device against the tire.

The pin 32 may then be tightened to lock the hooks 20 and the roller 38 in engagement with the tire after which the handle 58 is gripped and moved downwardly. As the handle 58 is moved downwardly the hand lever 54 swings on the pivot bolt 52 and moves the indicating needle of the spring scale 62. When sufficient force has been applied to the handle 58 to start the wheel 24 rotating, the reading on the scale 62 is noted.

The testing device is then transferred to the wheel on the opposite side of the car and tested. If in testing the second wheel the scale 62 reads higher, the brake is loosened and the wheel is retested and vice-versa. When the force required to overcome the resistance of the brake on the second wheel is equal to that required to move the first wheel, the brakes are properly adjusted. The same tests will then be made on the wheels at the other end of the car and they will be adjusted for a lower or higher reading as the case requires.

From the description of my device it will readily be seen that I have provided a device for attaining the objects contemplated and my device insures accuracy in the testing of brakes so that they may be adjusted accurately for proper working.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:

1. A tester for automobile brakes comprising a wheel engaging device including a plate, a pair of tire engaging hooks and a tire engaging lever pivoted on said plate, an operating lever secured to said tire engaging lever, a hand lever pivoted to said operating lever and a scale device interposed between one arm of said hand lever and said operating lever for registering the force applied to the hand lever relative to the operating lever.

2. A tester for automobile brakes comprising a wheel engaging device including a plate, a pair of tire engaging hooks and a tire engaging lever pivoted thereon, an operating lever extending from said tire engaging lever, a hand lever pivoted to said operating lever and a scale device interposed between an arm of said hand lever and said operating lever for registering the force applied to the handle relative to the operating lever.

3. A tester for automobile brakes comprising a plate, wheel engaging arms thereon, an operating lever extending from and rigidly connected with one of said arms, a hand lever pivoted to said operating lever, and a scale device interposed between an arm of said hand lever and said operating lever for registering the force applied to the hand lever relative to the operating lever.

4. A tester for automobile brakes comprising a plate portion, tire engaging hooks pivoted thereto, a tire engaging lever also pivoted thereto and having projecting means adapted to engage the tire at a point opposite said tire engaging hooks, operating means extending from said tire engaging lever and force measuring means mounted upon said operating means for registering the force required to rotate the wheel.

5. A tester for automobile brakes comprising a plate portion, tire engaging hooks pivoted thereto, a tire engaging lever also pivoted thereto and having a projecting roller adapted to engage the tire at a point opposite said tire engaging hooks, and operating means extending from said tire engaging lever for registering the force required to rotate the wheel, said operating means comprising an operating lever, a hand lever pivoted thereto and a scale interposed between said hand lever and said operating lever.

6. A brake tester for wheels comprising a wheel engaging device including a plate, a pair of spaced hooks extending therefrom for engaging the periphery of the wheel, a wheel engaging lever pivoted on said plate for engaging the periphery of the wheel substantially diametrically opposite said hooks in combination with an operating lever for causing pivotal movement of said wheel engaging lever to cause such engagement, a hand lever for actuating said operating lever to rotate the wheel and means for measuring the force required to cause such rotation.

7. A brake tester for wheels comprising a wheel engaging device including a plate, a pair of spaced hooks thereon for engaging the periphery of the wheel, a wheel engaging lever pivoted on said plate for engaging the periphery of the wheel substantially diametrically opposite said hooks, in combination with an operating lever movable in a plane parallel with the plane of said wheel for causing pivotal movement of said wheel engaging lever to cause such engagement and thereafter rotate the wheel engaging device by continued movement in the same plane.

8. A brake tester for wheels comprising a wheel engaging device including a plate, a pair of spaced hooks pivoted thereto for engaging the periphery of the wheel, a lever pivoted on said plate, a roller on said lever for engaging the periphery of the wheel substantially diametrically opposite said hooks, in combination with an operating lever for causing pivotal movement of said first mentioned lever to cause such engagement and thereafter rotate the wheel engaging device, an actuating handle pivoted to said operating lever, said handle having a lever extension and a spring scale connecting said lever extension to said operating lever whereby the force applied to the handle for actuating the operating and wheel engaging levers and for rotating the wheel can be measured.

9. In a brake tester, means for rotating a wheel of an automobile comprising a substantially L-shaped tire engaging member, a pair of tire engaging hooks, means pivotally connecting said hooks to said L-shaped member, a lever connected with said L-shaped member, and measuring means on said lever to determine the force exerted thereon for turning the wheel.

10. A brake tester comprising a medially laterally offset lever, a plurality of hook members offset at their extremities in a direction opposite to the offset of said lever, said offset portions being adapted to engage the tread only of a wheel tire, means pivotally connecting said hook members to said offset lever, a bell-crank lever pivotally mounted on the outer extremity of said lever, and a spring scale device connected to the offset part of said lever and to one arm of the bell-crank lever, whereby rocking of the latter in one direction tensions the spring of said scale and actuates said scale to cause it to indicate the resistance of the brake to the turning of the wheel, while simultaneously causing said lever to swing to clamp said clutch members upon the tire.

ALFRED B. SEPPMANN.